US012502569B2

(12) United States Patent
Colaco

(10) Patent No.: US 12,502,569 B2
(45) **Date of Patent: *Dec. 23, 2025**

(54) FIRE SUPPRESSION DEVICE

(71) Applicant: Syler A. Colaco, Leawood, KS (US)

(72) Inventor: Syler A. Colaco, Leawood, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,864

(22) Filed: Aug. 3, 2023

(65) Prior Publication Data

US 2023/0372754 A1 Nov. 23, 2023

Related U.S. Application Data

(63) Continuation of application No. 17/322,008, filed on May 17, 2021, now Pat. No. 11,752,377, which is a continuation of application No. 16/998,388, filed on Aug. 20, 2020, now Pat. No. 11,033,766.

(51) Int. Cl.
*A62C 19/00* (2006.01)
*A62C 3/02* (2006.01)
*A62C 8/00* (2006.01)

(52) U.S. Cl.
CPC .............. *A62C 19/00* (2013.01); *A62C 3/025* (2013.01); *A62C 8/005* (2013.01)

(58) Field of Classification Search
CPC .......... A62C 3/025; A62C 19/00; A62C 8/005
USPC ............................................................ 169/36
See application file for complete search history.

(56) References Cited

U.S. PATENT DOCUMENTS 8,230,789 B1 * 7/2012 Williams ................ F42B 12/22 102/302
11,033,766 B1 * 6/2021 Colaco ................... A62C 8/005
11,752,377 B2 * 9/2023 Colaco ................... A62C 19/00 169/47
2017/0226440 A1 * 8/2017 Fandrich ................. C10L 5/368
2020/0018582 A1 * 1/2020 Erickson ................ A62C 3/025

FOREIGN PATENT DOCUMENTS

CN 201045571 Y 4/2008
CN 101363699 A 2/2009

OTHER PUBLICATIONS

European Patent Application 21858799.6, Extended Search Report, issued Sep. 3, 2024.

* cited by examiner

*Primary Examiner* — Jason J Boeckmann
(74) *Attorney, Agent, or Firm* — Erise IP, P.A.

(57) ABSTRACT

A fire suppression device may be launched from a handheld, stand alone, or object- or vehicle-mounted device. The fire suppression device may be propelled by a first accelerant ejected out of a proximal end of the fire suppression device. The fire suppression device may be ruptured by a second accelerant after a predetermined amount of time. A fire suppressant may be dispersed on a fire when the fire suppression device is ruptured.

19 Claims, 7 Drawing Sheets

FIRE SUPPRESSION DEVICE

RELATED APPLICATIONS

This application is a continuation application, and claims priority benefit, with regard to all common subject matter, of earlier-filed U.S. patent application Ser. No. 17/322,008, filed May 17, 2021, and entitled "FIRE SUPPRESSION DEVICE" ("the '008 Application"). The '008 Application is a continuation application, and claims priority benefit, with regard to all common subject matter, of earlier-filed U.S. patent application Ser. No. 16/998,388, filed Aug. 20, 2020, now U.S. Pat. No. 11,033,766, issued Jun. 15, 2021, and entitled, "FIRE SUPPRESSION DEVICE" ("the '766 Patent). The above-referenced patent application and patent are hereby incorporated by reference in their entirety into the present application.

BACKGROUND

1. Field

Embodiments of the invention are broadly directed to systems and assemblies for firefighting. Specifically, embodiments of the invention are directed to a fire suppression device that may be propelled and disperse a fire suppressant for extinguishing a fire.

2. Related Art

Fire suppression is important in protecting lives and property. Traditional fire suppression relies upon the application of a fire suppressant (such as a liquid, a gas, or a powder) to the fire. For example, a person may spray water onto the fire or direct a dry chemical powder from a fire extinguisher. These traditional methods have severe drawbacks. For example, spraying water into a structural fire often causes more damage to the structure from the water than from the fire itself. Water damage to structures causes damage that may result in high repair costs and may even structurally compromise the building. In some cases, the water may result in irreparable damage and the structure may have to be torn down. Liquid fire suppressants are also heavy, difficult to transport, and difficult to spray on fires. Spraying liquid on a fire also requires direct line-of-sight to all burning material, which usually results in the structure having to be thoroughly soaked with the liquid to extinguish the fire.

Dry chemical fire suppression systems may also be used to extinguish fires. For example, fire extinguishers may use dry chemicals to extinguish fires. Dry chemical fire suppressants also have drawbacks. Dry chemical suppressants dispersed from a fire extinguisher have a very limited effective range. Dry chemical suppressants from a fire extinguisher also have similar direct line-of-sight problems that liquid suppressant systems have. Further, dry chemical suppressants from a fire extinguisher are typically single-use devices that are no longer useful once the dry chemical suppressant has been sprayed. Typical dry chemical suppressant systems cannot be refilled on site resulting in one shot to put out the fire with no backup.

What is lacking in the prior art is an easy-to-use and effective fire suppressant system that causes minimal property damage, can be used in both line-of-site and non-line-of-site applications, and is refillable on site. Further, what is needed is a device that attacks a fire at its source with pinpoint accuracy with little to no impact to the surroundings.

SUMMARY

Embodiments of the invention solve the above-described problems of typical fire suppressant systems by providing a fire suppression projectile device that releases a fire suppressant at the source of a fire. The fire suppression device may be propelled from a hand-held, stand alone, or mounted device. The fire suppression device may be fired using a combustion process, similar to a bullet being fired from conventional projectile firing devices currently on the market. The fire suppression device may be ruptured by a fuse when launched, by timer, or by heat from the fire. In some embodiments, the fire suppression device may contain an internal chamber housing an accelerant that, when heated to a particular temperature, combusts. The combustion of the accelerant may cause the projectile to explode and disperse the fire suppressant.

A first embodiment is directed to a fire suppression device for propelling into a fire and extinguishing a fire, the fire suppression device comprising a base with a proximal end and a distal end including a first accelerant for explosively expanding when compressed and a primer configured to compress the first accelerant; an interior section connected to the distal end of the base, the interior section comprising a fuse configured to ignite a second accelerant, wherein the fuse is ignited by the first accelerant; and an interior housing containing the second accelerant, wherein the second accelerant is ignited by the fuse, wherein the interior housing ruptures from an increase in pressure when the second accelerant expands. The fire suppression device further includes a cone, including a fire suppressant for extinguishing the fire, wherein the fire suppressant is disposed between an interior of the cone and the interior section, wherein the cone is configured to rupture when the second accelerant expands, and wherein the fire suppressant is dispersed when the cone ruptures from the expansion of the second accelerant.

A second embodiment is directed to a fire suppression device for propelling into a fire and extinguishing the fire, the fire suppression device comprising a base with a proximal end and a distal end including a first accelerant for explosively expanding when compressed, a primer configured to compress the first accelerant, wherein the explosive expansion of the first accelerant ejects the first accelerant out of a proximal end of the fire suppression device propelling the fire suppression device, a cone housing the base, and a fire suppressant for extinguishing the fire disposed in a cone cavity of the cone, wherein the fire suppressant is dispersed when the cone ruptures.

A third embodiment is directed to a method of extinguishing a fire using a fire suppression device, the method comprising the steps of propelling the fire suppression device by compressing a first accelerant to create an explosive expansion of the first accelerant, wherein the first accelerant is ejected out of a proximal end of the fire suppression device to propel the fire suppression device into the fire, and igniting a second accelerant creating an explosive expansion of the second accelerant after a predetermined time, wherein the explosive expansion of the second accelerant ruptures a cone and disperses a fire suppressant into the fire.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF DRAWINGS

Embodiments of the invention are described in detail below with reference to the attached drawing figures, wherein.

Figure 1:
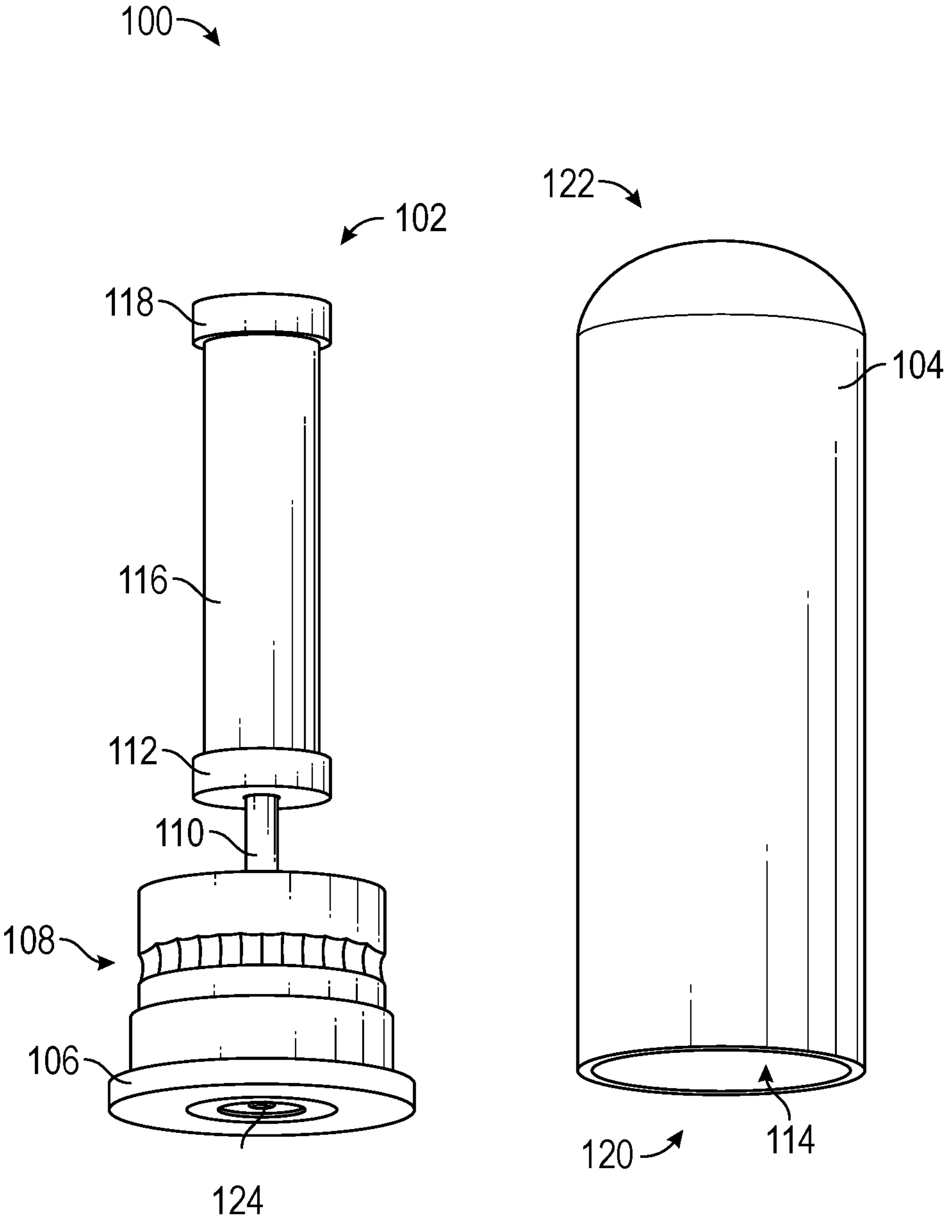
FIG. 1 depicts an embodiment of a fire suppression device.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

In some embodiments, a fire suppression device may be loaded into any standard projectile delivery device. The delivery device may be any hand-held, stand-alone, or mounted firing system. The fire suppression device may be launched from hand-held devices such as guns, rocket propelled grenade launchers, canons, or any other device used for propelling a projectile. Further, the fire suppression device may be fired from a stand-alone delivery device such as an artillery unit. The artillery unit may be utilized when the user may not be able to move close to the fire. This may be useful when fighting wildfires or fires that may not be reachable such as, for example, oil rig and chemical fires. Further, the fire suppression device may be fired from an object- or vehicle-mounted delivery device such as, for example, a helicopter, airplane, automobile, tank, and any other vehicle that may support a delivery device as described herein.

The fire suppression device may be activated by the delivery device to be propelled. In some embodiments, the propellant, or first accelerant, may be solid, liquid, or gas. In exemplary embodiments described herein, the accelerant may be black powder. However, any accelerant such as, for example, kerosene, rocket fuel, hydrogen, and oxygen may be used. The propellant may also be air, water, carbon dioxide, nitrogen, or any other pressurized fluid or gas.

Embodiments of the fire suppression device may be used to extinguish many types of fires. For example, the fire suppression device may be used to extinguish house fires, wildfires, controlled fires, vehicle fires, electrical fires, upholstery fires, oil fires, chemical fires, or any other types of fires that may be extinguished using a fire-suppressive substance.

In some embodiments, the size, shape, and caliber of the fire suppression device may be selected based at least in part on the type of fire. For example, a large caliber fire suppression device (e.g., 120 mm) may be delivered from an aerial vehicle to a wildfire. In another exemplary embodiment, a medium caliber (e.g., 40 mm) fire suppressive device may be delivered from a hand-held delivery device to a car fire. In some embodiments, fire suppression devices may a specific size and shape for oil fires and chemical fires and may be used on oil rigs and oil platforms. Any combination of size and shape of the fire suppression device with any combination of accelerants and fire suppressant may be contemplated to extinguish any type of fire.

In some embodiments, the fire suppressant, or fire suppression material, may be a dry or wet chemical for extinguishing a fire. The fire suppressant may be carbon dioxide, nitrogen, potassium bicarbonate, sodium bicarbonate, multi-purpose ABC, water, and an evaporating fluorocarbon. In embodiments described herein, the fire suppressant may be a dry chemical powder that may be dispersed when an outer shell, or cone, is ruptured by an internal explosion. The fire suppressant may be dispersed onto a fire to extinguish the fire. The fire suppressant may be any of water, wet chemical, foam, dry chemical powder, carbon dioxide, vaporizing liquid and any other fire suppressants listed above and may be any combination of fire class ratings. For example, the fire ratings that the fire suppressant may be used for may be classes A-F and K and any other ratings that may be used.

FIG. 1 depicts an exemplary fire suppression device 100 comprising an interior section 102 and a cone 104. The interior section 102 comprises a washer 106, a base 108, a fuse housing 110 comprising a fuse (not shown), a proximal plate 112, an interior housing 116, and a distal plate 118. The cone 104 may be placed around the interior section 102 with a cone proximal end 120 of the cone 104 contacting the washer 106. The interior section 102 may be inserted into the cone 104 through the cone cavity 114 at the cone proximal end 120. The cone 104 may be connected to the washer 106 and the base 108 with an adhesive, or the cone 104 and the base 108 may be configured with threads and the cone 104 may be screwed onto the base 108. A cone distal end 122 may be aerodynamically shaped to propel through the air to the fire.

In some embodiments, a primer 124 is disposed in the base 108 through the washer 106 and ignites a first accelerant in the base 108 that propels the fire suppression device 100. The first accelerant may ignite the fuse in the fuse housing 110, which, in turn, ignites a second accelerant disposed in the interior housing 116. The fire suppressant may be disposed in the cone cavity 114 between the cone 104 and the interior housing 116. When the second accelerant ignites, the interior housing 116 may rupture, causing the cone 104 to rupture and the fire suppressant to be dispersed. In some embodiments, the washer 106 and primer 124 are not propelled, and the fire suppression device 100 acts similarly to a bullet fired from a gun leaving a washer and shell behind.

Figure 2:
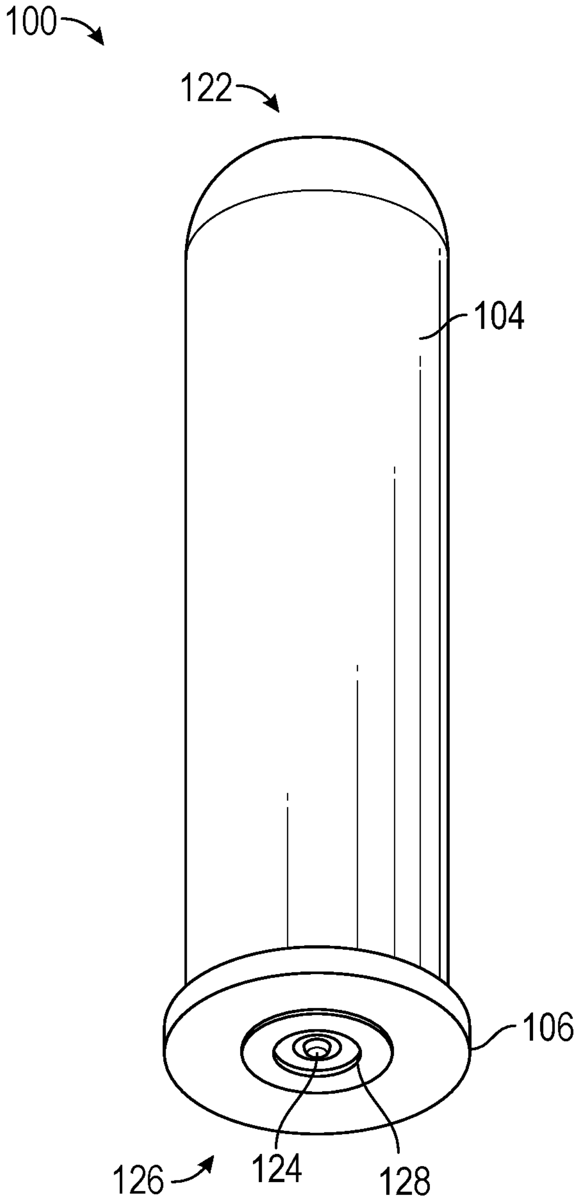
FIG. 2 depicts an embodiment of a proximal end of the fire suppression device of FIG. 1.

FIG. 2 depicts the fire suppression device 100 from a proximal end 126 presenting the washer 106, the primer 124, and a cap 128. In some embodiments, the cap 128 is disposed in the base 108 with the washer 106 disposed at the proximal end 126 and surrounding the cap 128. Further, the primer 124 may be disposed in the cap 128.

The fire suppression device 100 may be disposed in a delivery device. When the firing mechanism of the delivery device is activated, a pin from the firing mechanism may contact the primer 124 and move the primer 124 inwards relative to the cap 128. The primer 124 may compress the first accelerant enclosed in the base 108. The compression causes the first accelerant to rapidly expand in an explosive manner, propelling the fire suppression device 100 in the direction of the cone distal end 122.

Figure 3:
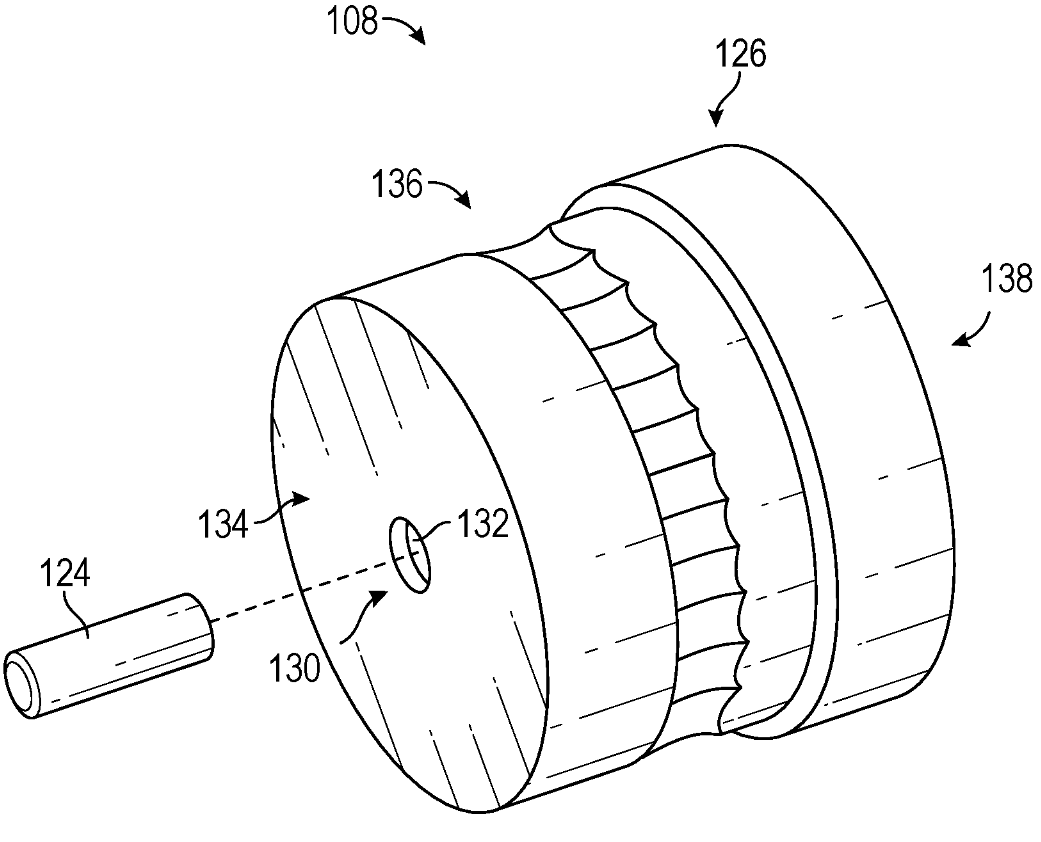
FIG. 3 depicts an embodiment of a base of the fire suppression device.

FIG. 3 depicts an embodiment of the base 108. The base 108 may comprise a hole 130 configured to receive the primer 124. The first accelerant may be disposed within a base cavity 132 of the base 108, such that the primer 124 contacts the first accelerant and compresses the first accelerant upon contact with the delivery device firing pin. The cap 128 and washer 106 may contact the base proximal face 134 and be connected by an adhesive.

In some embodiments, the base 108 may comprise a recessed area 136 for receiving a ring (not shown). The ring may be rubber, plastic, or any material capable of creating a seal between the base 108 and the cone 104 when the interior section 102 is placed inside the cone 104. In some embodiments, the cone 104 may be configured to receive the base 108 and the ring may compress to create a seal between the base 108 and cone 104. The diameter of the washer 106 may be slightly larger than the diameter of the base 108, creating a contact between the washer 106 and the cone 104. The cone 104 may slide over the base 108 and contact the washer 106 and the ring may create a seal between the base 108 and cone 104, such that the fire suppressant housed in the cone 104 does not leak out. In some embodiments, at least part of the base 108 may disconnect from the cone 104 and remain in the chamber of the delivery device. In some embodiments, the base 108 may comprise a first part that stays in the chamber of the delivery device upon firing and a second part that disconnects from the first part and travels with projectile when fired.

Figure 4:
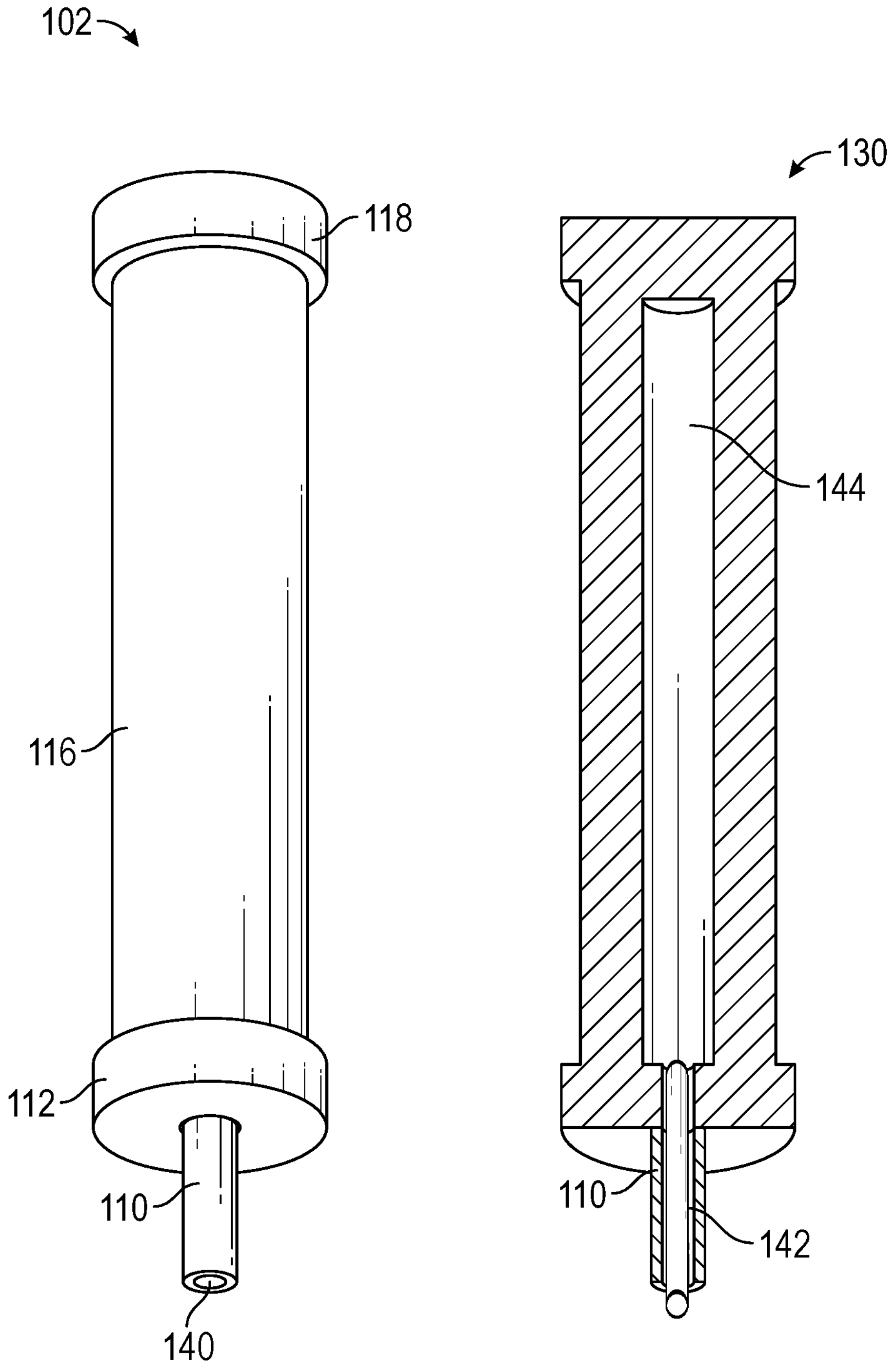
FIG. 4 depicts an embodiment of the interior of the fire suppression device.

In some embodiments, a base distal end 138 may be connected to the fuse housing 110 shown in FIGS. 1 and 4. The base distal end 138 may comprise a hole for receiving the fuse from the fuse housing 110. The first accelerant, disposed in the base cavity 132, ignites the fuse when the first accelerant is ignited. In some embodiments, the first accelerant may propel the fire suppression device 100 and ignite the fuse when the first accelerant is compressed.

FIG. 4 depicts an embodiment of the fire suppression device 100 with the cone 104 removed. The interior section 102 of the fire suppression device 100 comprises the base 108 (shown in FIG. 3), the fuse housing 110, the proximal plate 112, the interior housing 116, and the distal plate 118. As described above, in some embodiments, the base 108 houses the first accelerant that ignites when the firing pin of the firing mechanism engages the primer 124 of the base 108 and compresses the first accelerant. The first accelerant rapidly expands, propelling the fire suppression device 100 and igniting a fuse 142 in the fuse housing 110.

The fuse 142 may be disposed in a fuse chamber 140 of the fuse housing 110 and may be black powder and any other accelerant. In some embodiments, the fuse 142 may be a fabric material comprising an accelerant that burns at a predetermined rate based on an expected amount of time in the air. The fuse 142 may act as a delay between ignition of the first accelerant and ignition of the second accelerant. The first accelerant may propel the fire suppression device 100 into a fire, and the second accelerant may act to rupture the cone 104 and spread the fire suppressant as described above. The fuse 142 may provide a delay such that the fire suppression device 100 is in the fire before the cone 104 ruptures. The fuse housing 110 provides a structural connection between the base 108, where the first accelerant is disposed, and the interior chamber 144, where the second accelerant is disposed.

In some embodiments, the fuse 142 may be based on the timing for the second accelerant to ignite. In some embodiments, the fuse 142 may be a frangible bulb and a fusible link. The fuse 142 may be long or short based on the size of the fire suppression device 100 and the time delay required between ignition of the first accelerant and ignition of the second accelerant. For example, a large caliber round (e.g., 40 mm, 100 mm, 150 mm) may be in the air longer than a smaller round. Therefore, the fuse 142 may be slightly longer or may burn slightly slower than a smaller round fuse to allow a longer time before the second accelerant is ignited. This allows for a time delay between the propulsion of the fire suppression device 100 and explosion of the fire suppression device 100. This allows time for the fire suppression device 100 to fly through the air and land in the fire before dispersion of the fire suppressant.

In some embodiments, the fuse 142 burns into the interior housing 116 igniting a second accelerant that explosively expands. The second accelerant may be disposed in an interior chamber 144 of the interior housing 116. The interior housing 116 may be made of plastic, metal, wood, glass, and any composite material such that the interior housing 116 ruptures upon expansion of the second accelerant. When the fuse 142 burns from ignition at the base cavity 132 to the interior chamber 144, the second accelerant in the interior chamber 144 ignites. When the second accelerant ignites, the second accelerant expands rapidly in an explosive manner. An extreme increase in pressure may rupture the interior housing 116, transferring the increased pressure from the interior chamber 144 to the interior of the cone 104, or the cone cavity 114, where the fire suppressant material is housed.

In some embodiments, the fire suppressant is housed between the cone 104 and the interior housing 116 in the cone cavity 114. Upon ignition of the second accelerant, the pressure from the expanding second accelerant may translate through the fire suppressant rupturing the cone 104. When the cone 104 is ruptured, the fire suppressant may be dispersed into the surrounding environment. The cone 104 may comprise plastic, metal, wood, glass, and any other material that may stay intact while being projected and rupture upon expansion of the second accelerant.

The second accelerant may be added to the interior chamber 144 by removing the proximal plate 112 and the distal plate 118. In some embodiments, only the distal plate 118 is removable. The distal plate 118 may be removed and the second accelerant added to the interior chamber 144. In some embodiments, the distal plate 118 may then be attached to the interior housing 116 by an adhesive such that the interior chamber 144 is sealed and tamper proof. In some embodiments, the distal plate 118 and the interior housing may comprise threads and the distal plate 118 may be screwed on.

Figure 5:
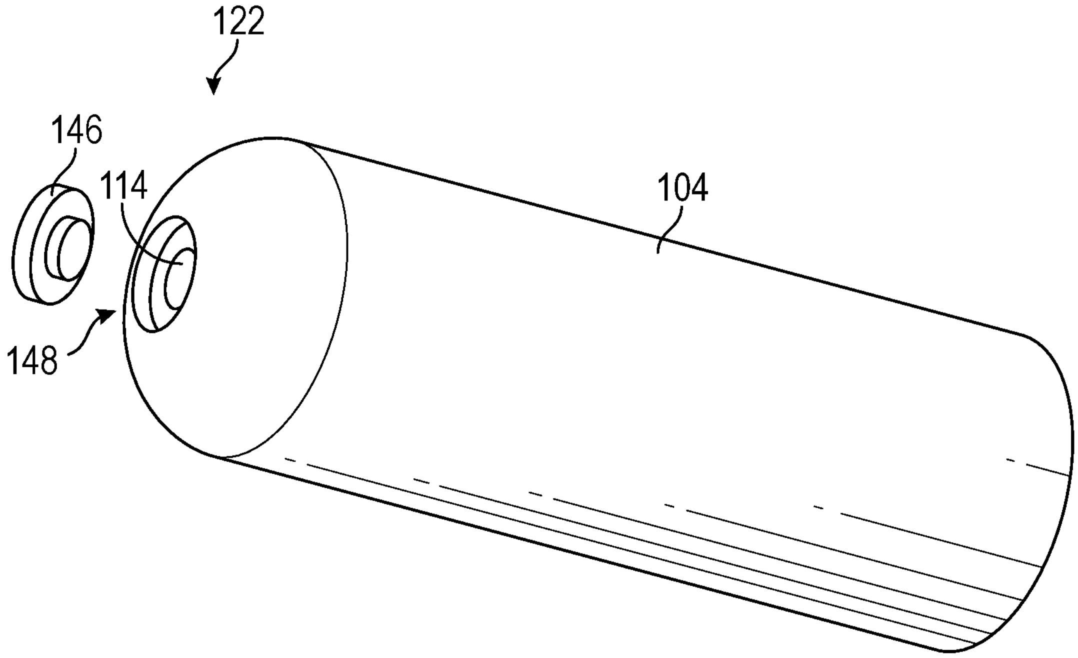
FIG. 5 depicts an embodiment of the cone of the fire suppression device.

FIG. 5 depicts the cone 104 with the cone distal end 122. In some embodiments, the cone distal end 122 comprises a removable plug 146. A cone hole 148 at the cone distal end 122 may be accessible for receiving the fire suppressant material. The plug 146 may be removed, revealing the cone hole 148 and the cone cavity 114. The fire suppressant material may be added to the cone 104 through the cone hole 148 then the plug 146 may be reattached. The plug 146 may be attached to the cone 104 by snapping the plug 146 into place or, in some embodiments, the plug 146 and the cone 104 may comprise threads and the plug 146 may be screwed into the cone distal end 122. In some embodiments, the plug 146 may be attached to the cone 104 with an adhesive and any combination of the above-described methods.

In some embodiments, the fire suppression device 100 may be many various sizes and shapes that may be determined by the type of fire, the delivery device, and access. For example, the class rating of the fire may dictate the suppressant material and the size of the fire may dictate the amount of suppressant material that is needed. Therefore, the type of suppressant material and the caliber of the fire suppression device 100 may be dictated by the fire.

Alternatively, a caliber and type of suppressant material may be dictated by access. For example, a car may catch fire on a highway and a police officer may respond to an emergency call to put the fire out. The police officer may have a standard issue delivery device and standard fire suppressant caliber devices for the delivery device for these particular types of fires. As such, the police office may utilize the fire suppression device 100 to extinguish the car fire. However, in the embodiments described above, the fire suppression device 100 is capable of being launched from any large caliber launching device. For example, the fire suppression device 100 may be in the range of 10 mm and greater. Further, the fire suppression device 100 may be launched from any device capable of launching the standard size of the fire suppression device 100. For example, the fire suppression device 100 may be launched from a hand-held launching device, a stand-alone device, and an object- or vehicle-mounted device.

Figure 6:
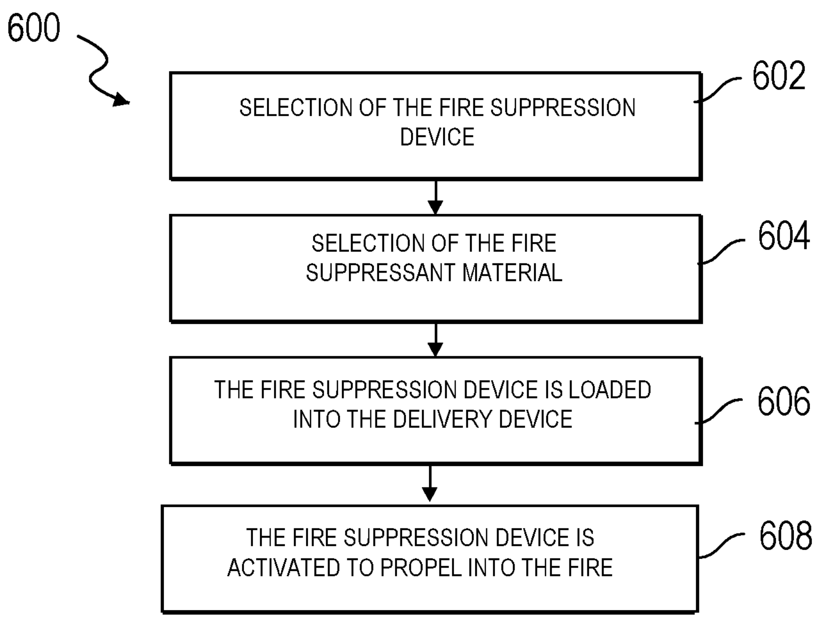
FIG. 6 depicts a flow chart presenting an exemplary method of preparing and launching the fire suppression device.

FIG. 6 depicts an exemplary method of preparing and launching the fire suppression device 100 generally referenced by the numeral 600. At step 602, the user may select the size of the fire suppression device 100 based on the use as described in embodiments above. The size (e.g., caliber) of the fire suppression device 100 may be selected based on the size and type of fire. For example, the fire may be a house fire, a brush fire, a campfire that has gotten out of control, a vehicle fire, a wildfire, an oil fire, a chemical fire, and any other type of fire that may be extinguished from a distance using the fire suppression device 100. Further, the fire suppression device 100 may be selected based on the method of delivery. For example, the fire suppression device 100 may be delivered by a hand-held, vehicle-mounted, ground-standing, and any other delivery device. In some embodiments, the size of the delivery device may also be selected based on the type and size of the fire.

At step 604, the type and amount of fire suppressant may be selected. The fire type, provided in the examples described above, may dictate the type of fire suppressant necessary to extinguish the fire. For example, the selection of fire suppressant may be at least one of water, wet chemical, foam, dry chemical powder, carbon dioxide, vaporizing liquid, carbon dioxide, nitrogen, potassium bicarbonate, sodium bicarbonate, multi-purpose ABC, an evaporating fluorocarbon, and any other fire suppressant in any combination thereof. The fire suppressant may be added into the cone cavity 114 through the cone hole 148 when the plug 146 is removed. The plug 146 may be attached to seal the cone 104 such that the fire suppressant does not leak.

At step 606, the fire suppression device 100 is loaded into the launching device. The fire suppression device 100 may be loaded into a munitions chamber of the delivery device. The delivery device may be any device capable of firing the fire suppression device 100 based on the caliber of the fire suppression device 100. In some embodiments, the fire suppression device 100 may be selected based on the size and shape required by the delivery device as described above.

At step 608, the delivery device is activated to launch the fire suppression device 100. The fire suppression device 100 comprises the primer 124 such that the firing pin of the delivery device may contact the primer 124. The primer 124 may compress the first accelerant causing the first accelerant to explosively expand. The expansion may propel the fire suppression device 100 into the fire. The fire suppression device 100 may then explode in the fire, extinguishing the fire as described in embodiments herein.

Figure 7:
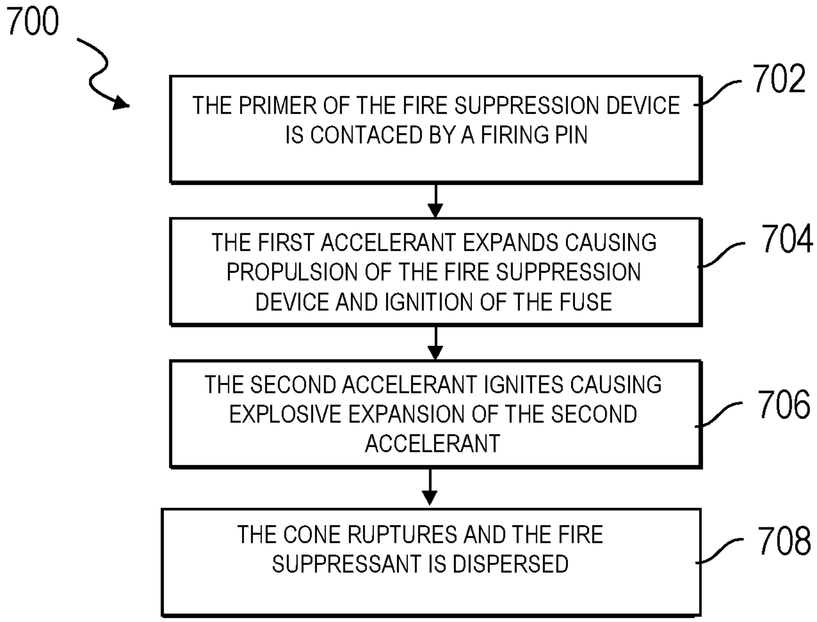
FIG. 7 depicts a flow chart presenting an exemplary method of suppressing a fire using the fire suppression device.

FIG. 7 depicts a method of firing the fire suppression device 100 and suppressing a fire using the fire suppression device 100 generally referenced by the numeral 700. At step 702, the fire suppression device 100 is activated by the pin of the delivery device contacting the primer 124 of the fire suppression device 100. The primer 124 may be moved into the base cavity 132 compressing the first accelerant. The primer 124 may be any standard size for use with the caliber of the fire suppression device 100. The primer 124 may be any standard material such as plastic or metal for use the caliber of the fire suppression device 100.

At step 704, the primer 124 may compress the first accelerant causing an explosive expansion of the first accelerant. The explosive expansion of the first accelerant may result in gas expanding from the proximal end 126 of the fire suppression device 100 and propelling the fire suppression device 100. Further, ignition of the first accelerant may ignite the fuse 142. The fire suppression device 100 may be propelled through the air into the fire while the fuse 142 burns through the fuse chamber 140 into the interior chamber 144. The length and width of the fuse 142 may be based at least in part on a desired delay time between ignition of the first accelerant and ignition of the second accelerant representing an expected time of flight. In some embodiments, the fuse 142 may comprise a fabric and an accelerant. The amount of accelerant added to the fuse 142 may be based at least in part on the desired delay time between ignition of the first accelerant and ignition of the second accelerant. In some embodiments, the fuse 142 may be an accelerant without fabric.

At step 706, the fuse 142 burns into the interior chamber 144 and ignites the second accelerant causing the second accelerant to explosively expand. When the second accelerant explosively expands, the pressure in the interior chamber 144 increases. The interior chamber 144 may rupture releasing the high pressure from the explosive expansion of the second accelerant into the cone cavity 114 containing the fire suppressant. The high pressure from the interior chamber 144 is transferred to the fire suppressant in the cone cavity 114. In some embodiments, the high pressure in the cone cavity 114 causes the cone 104 to rupture dispersing the fire suppressant.

At step 708, the pressure in the cone causes the cone to rupture and the fire suppressant material is dispersed on the fire. The fire suppressant extinguishes the fire.

In some embodiments, the cone 104 is configured to rupture on impact. For example, the fire suppression device 100 may fly into the fire and when the fire suppression device contacts an object, the cone 104 ruptures. The interior of the cone 104 may be high pressure based on the pressure that the fire suppressant was injected or the second accelerant in the interior chamber 144 may ignite creating the high pressure inside the cone 104. When the cone 104 ruptures, because of the high pressure, the fire suppressant may be dispersed.

In some embodiments, the fire may heat up the fire suppressant or the second accelerant causing a high pressure inside the cone 104. The cone 104 may rupture at a desired, or predetermined, pressure dispersing the fire suppressant into the fire.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A fire suppression device for propelling into and extinguishing a fire, comprising:
- an interior section, comprising:
  - a base, comprising:
    - a base cavity configured to house a first accelerant configured to ignite when compressed; and
    - a primer configured to compress the first accelerant;
  - an interior housing comprising an interior cavity configured to house a second accelerant; and
  - a fuse disposed between the base and the interior housing,
  - wherein the fuse is configured to be ignited by the first accelerant, and
  - wherein the fuse is configured to ignite the second accelerant after a delay;
- a cone configured to house at least a portion of the interior section, the cone comprising a cone cavity configured to house a fire suppressant between an interior surface of the cone and the interior section,
- wherein the base of the interior section is at least partially disposed within the cone,
- wherein the cone is configured to rupture upon ignition of the second accelerant, and
- wherein the rupture of the cone disperses the fire suppressant.

2. The fire suppression device of claim 1, wherein a burn time of the fuse is based at least in part on an expected time of flight of the fire suppression device.

3. The fire suppression device of claim 1, wherein the fuse comprises a fabric and a fuse accelerant.

4. The fire suppression device of claim 3, wherein a volume of the fuse accelerant is based at least in part on a desired delay between ignition of the first accelerant and ignition of the second accelerant.

5. The fire suppression device of claim 1, wherein the first accelerant propels the fire suppression device.

6. The fire suppression device of claim 1,
- wherein the fire suppression device is configured to be used with a delivery device,
- wherein the delivery device is one of a hand-held delivery device, a stand-alone delivery device, an object-mounted delivery device, and a vehicle-mounted delivery device.

7. A fire suppression device for propelling into and extinguishing a fire, comprising:
- an interior section comprising a base, the base comprising:
  - a base cavity housing a first accelerant configured to ignite when compressed; and
  - a primer configured to at least partially move into the base to compress the first accelerant,
  - wherein the first accelerant is configured to ignite upon compression and propel the fire suppression device; and
  - a second accelerant; and
- a cone configured to at least partially house the interior section including housing at least a portion of the base, the cone comprising:
  - a cone cavity,
  - a fire suppressant disposed in the cone cavity; and
  - a ring providing a seal between the base and the cone,
  - wherein the base further comprises a recessed area for receiving the ring,
  - wherein the cone is configured to rupture upon ignition of the second accelerant and wherein the rupture of the cone disperses the fire suppressant.

8. The fire suppression device of claim 7, wherein the cone further comprises:
- the second accelerant disposed inside the interior section; and
- a fuse disposed between the base and the interior section,
- wherein the fuse is configured to be ignited by the first accelerant, and
- wherein the fuse is configured to ignite the second accelerant.

9. The fire suppression device of claim 8, wherein a burn time of the fuse is based at least in part on an expected time of flight of the fire suppression device.

10. The fire suppression device of claim 8, wherein the fuse comprises a fabric and a fuse accelerant.

11. The fire suppression device of claim 10, wherein a volume of the fuse accelerant is based at least in part on a desired delay between ignition of the first accelerant and ignition of the second accelerant.

12. The fire suppression device of claim 8, wherein the fuse comprises a fuse accelerant without a fabric.

13. The fire suppression device of claim 8, wherein the fire suppressant is based at least in part on a type of a fire.

14. A method of extinguishing a fire using a fire suppression device, the method comprising:
- providing an interior section at least partially disposed within a cone;
- moving a primer into a base cavity hosing a first accelerant;

propelling the fire suppression device by compressing the first accelerant in the base cavity of the base with the primer to create an ignition and explosive expansion of the first accelerant, wherein the first accelerant is ejected out of the base cavity of the base of the interior section to propel the fire suppression device into the fire, wherein the base is at least partially disposed in the cone;

igniting a fuse by the first accelerant;

igniting, by the fuse and after a delay, a second accelerant creating an explosive expansion of the second accelerant, wherein the second accelerant is disposed between an inner surface of the cone and the interior section; and rupturing the cone by the explosive expansion of the second accelerant to disperse a fire suppressant into the fire.

15. The method of claim 14, wherein the fire suppression device is configured to be used with a delivery device, wherein the delivery device is one of a hand-held delivery device, a stand-alone delivery device, an object-mounted delivery device, and a vehicle-mounted delivery device.

16. The method of claim 14, wherein a burn time of the fuse determines when the second accelerant is ignited.

17. The method of claim 14, wherein a burn time of the fuse is based at least in part on an expected time of flight of the fire suppression device.

18. The method of claim 14, wherein a burn time of the fuse is based at least in part on a type of the fire.

19. The method of claim 14, wherein a burn time of the fuse is based at least in part on a selected delivery device.

* * * * *